United States Patent
Nurminen et al.

(12)

(10) Patent No.: US 6,758,970 B1
(45) Date of Patent: Jul. 6, 2004

(54) FILTERING UNIT AND METHOD OF SEALING SAME

(75) Inventors: Teppo J. Nurminen, Vantaa (FI); Martin J. Still, Tuusula (FI)

(73) Assignee: Steris Europe, Inc. Suomen Sivuliike, Tuusula (FI)

( * ) Notice: Subject to any disclaimer, the term of this patent is extended or adjusted under 35 U.S.C. 154(b) by 82 days.

(21) Appl. No.: 10/030,738

(22) PCT Filed: Jun. 21, 2000

(86) PCT No.: PCT/FI00/00556
§ 371 (c)(1),
(2), (4) Date: Apr. 15, 2002

(87) PCT Pub. No.: WO01/03813
PCT Pub. Date: Jan. 18, 2001

(30) Foreign Application Priority Data

Jul. 9, 1999 (FI) .................................................. 991576

(51) Int. Cl.[7] .......................... B01D 35/14; B01D 29/00
(52) U.S. Cl. ...................... 210/232; 210/85; 210/323.1; 210/323.2; 210/450; 210/490
(58) Field of Search ....................... 210/85, 232, 323.1, 210/323.2, 328, 348, 450, 483, 490, 510.1

(56) References Cited

U.S. PATENT DOCUMENTS

| 4,207,192 A | 6/1980 | Coplan et al. |
| 4,210,536 A | 7/1980 | Coplan et al. |
| 4,220,489 A | 9/1980 | Coplan et al. ............. 156/73.6 |
| 4,547,289 A | 10/1985 | Okano et al. ................ 210/652 |
| 4,631,128 A | 12/1986 | Coplan et al. ........... 210/321.5 |
| 5,015,316 A | 5/1991 | Ostreicher et al. ............ 156/69 |
| 5,104,546 A | 4/1992 | Filson et al. ................. 210/650 |
| 5,254,250 A * | 10/1993 | Rolchigo et al. ...... 210/321.67 |
| 5,422,057 A | 6/1995 | Karbachsch et al. ........ 264/257 |
| 5,545,242 A * | 8/1996 | Whitlock et al. ............. 55/502 |
| 6,361,575 B1 * | 3/2002 | Alvin et al. .................. 55/378 |

FOREIGN PATENT DOCUMENTS

| GB | 1286875 | 8/1972 |
| WO | WO 98/28060 | 7/1998 |

* cited by examiner

Primary Examiner—John Kim
(74) Attorney, Agent, or Firm—Fay, Sharpe, Fagan, Minnich & McKee, LLP

(57) ABSTRACT

Ceramic filter elements (1, 15, 26) have a feed surface covered with a ceramic filter membrane (4, 19). As a feed liquid flows over the feed surface, a portion of the liquid passes through the membrane and the filter and is discharged through a discharge surface as a permeate liquid flow. Between the feed and discharge surfaces, the filter element includes an impermeable surface portion (8, 24, 30) which contacts a seal or gasket assembly (17, 29). The seal or gasket assembly includes two seal portions (9, 10) which define a channel (12, 22, 31) in between. The channel connects with a discharge channel (11, 23, 32). In this manner, any liquid leaking between the filter element and another filter element or a housing (21, 27) enters the discharge channel (11, 23, 32). Liquid in the discharge channel indicates a leak in the seal and potential contamination of the permeate liquid.

17 Claims, 5 Drawing Sheets

US 6,758,970 B1

FILTERING UNIT AND METHOD OF SEALING SAME

FIELD OF THE INVENTION

The invention relates to filtration by means of crossflow technique and filtering elements having a filter membrane on a porous carrier.

Particularly, the invention relates to a crossflow membrane filtering unit having a sealing system including a channel enabling the detection of a leak without the quality of the filtrate being impaired.

BACKGROUND OF THE INVENTION

The removal of solids from a liquid by filtration can take place in several, principally different manners. In so-called dead end filtration, a suspension is driven in its entirety towards a filter, and a filter cake is formed which the filtrate penetrates. In cross-flow filtration, the mixture to be filtered is pumped across the filter clement in a circuit, whereby part of the mixture penetrates the filtering elements forming a permeate stream. In the ideal case, no cake is formed, but the material to be separated is enriched in the circulating phase, and a certain fraction is continuously being removed therefrom as a reject stream. The quality of the permeate is basically dependant on the pore size of the filtering element membrane. This pore size can be very narrowly defined. In microfiltration, the pore diameter can be 0.1–10 $\mu$m, and in ultrafiltration down to 1 nm. Thus, separation of molecules on the basis of size is possible by means of filtration. One application is the removal of pyrogens from water, pyrogens having relatively large molecules.

Membrane filtration elements have porous carrier structures, on the filtering surfaces of which membranes having well defined pore sizes have been formed.

Membranes with small pore sizes can be formed from e.g. polymer films. These are not, however, particularly resistant to mechanical and thermal stress, which is a drawback in sterilisation and cleaning. Ceramic membranes on porous, ceramic carrier phases have also been developed. Most ceramic materials resist heat in addition to being mechanically durable. On a ceramic element, as on other materials, surfaces can also be sealed, i.e. made impermeable. Thus, three types of surfaces may occur on a ceramic filter element: membrane coated, sealed, and untreated, through which permeate flows freely.

For example, in U.S. Pat. No. 5,104,546 a multilayer ceramic tubular filter element is disclosed, suitable for pyrogen removal by ultrafiltration. The end walls of the element as well as the inner walls of the channels are membrane coated. When the element is fitted into a shell or housing, and a mixture is pumped through the inner channels, permeate flows through the porous carrier to the shell side. Seals, for example rubber gaskets, must be provided between the shell and the element end walls.

In addition to tubular elements, plate-shaped ceramic elements are generally known, see for example WO 98/28060 and references therein. A plate-shaped filter element has a membrane coated outer surface and an aperture in the centre or elsewhere, the walls of which aperture are not membrane coated. Filters can be assembled by stacking such plates, as shown in e.g. GB 1 268 875. Due to the shape of the plates, the mating surfaces may be higher than the filter surfaces, whereby free filter area is provided between the plates as stacks are formed; plates may be separated by spacers; or if the seals between plates are thick enough, the seals function as spacers. Thus, the central apertures form a permeate retrieval and exit channel, and the plate stack forms a flanged-tube structure across which the pressurised mixture to be filtered is allowed to flow. The mixture thus flows on the shell side and the permeate is collected from the inner channel.

As stacks are assembled, seals must be used between the plates and/or the spacers, and between the elements and the housing, the number of seals being proportional to the number of plates used.

FIG. 1 shows a filter plate 1 according to the prior art, having a central bore 2. FIG. 2 shows a section of part of a stack formed from plates 1. Four plates are shown in the Figure, but the stack may comprise additional plates depending on required filter surface area; the stack is confined in a housing not shown in the Figure. In the housing, a flow of pressurized mixture for filtration is maintained. The plates comprise a porous ceramic support body 3, formed from e.g., aluminum oxide and having a relatively large pore size, e.g., >1 $\mu$m, and on the surface of the support body has been formed a ceramic filter membrane 4. The membrane has been formed from e.g., titanium or zirconium oxide. The central bores 2 of the plates form a permeate channel 6; in the embodiment shown, a perforated tube 5 is provided therein. The joints between the mating faces of the plates are sealed by means of O-rings 7.

During the filtration process, bodies smaller than the pores of membrane 4, as e.g. water molecules in the case of ultrafiltration, pass through the membrane due to the pressure difference, and are carried through the porous support body into the permeate chamber and exit through the end fittings.

In the above described filter units, the seals between the mixture and the permeate side are potential leak sites, and in demanding filtering processes a small leak may immediately render the permeate useless, as the mixture to be filtered penetrates into the permeate channel.

In tube or tube bundle type ceramic filter units, the sealing problem is associated with the end sections of the units. If the feed mixture penetrates the joint between the housing and the filter clement and enters the shell side, the permeate is contaminated. In plate stack-type filter units, potential leak sites are the joints between the plates and between the plate stack and the housing.

SUMMARY OF THE INVENTION

A main object of the invention is a crossflow-type membrane filtering unit wherein the sealing system between the filtering element and its housing comprises a channel through which tho feed mixture on penetrating the seal system can flow without penetrating the whole sealing system, thereby indicating a leak.

In an embodiment using plate-shaped filtering elements, two concentric seals are preferably used between the filter plates. Thus, a space delimited by the seals and two plates is formed. At the location of said space, the plate surface is sealed, that is made impermeable. In addition, at the location of said space, at least one opening is provided in each plate, interconnecting the spaces between adjacent plates in the stack. The walls of the opening(s) are also scaled, and consequently an isolated, sealed space surrounding the permeate channel is formed. A tube or equivalent can be provided to connect this space to the outside. If a leak occurs in a seal between two plates, the fluid may thus flow into the isolated space and out. Thus, a leaking seal can be detected immediately, and no possibility exists for the feed mixture to enter the permeate channel.

Preferably, the double seal system consists of two concentric, annular seals of different diameter. The seals may be of the O-ring type, and corresponding grooves may be provided in the filter plates. A huge range of O-ring seals designed for various chemical and physical conditions is available, and as the chemical and thermal durability of ceramic filter plates is usually high, a filter structure is thus provided which is functional in harsh conditions, with a low risk for permeate contamination by feed mixture.

In embodiments comprising filter elements of a tube or tube bundle structure, the joint between the filter housing and the filter element must be reliably sealed. The seal can be formed between the element end wall and the housing, or between the side walls of the element and the housing, and appropriate surface sealing of the filter element at the site of the seal system must be provided.

Surface scaling can be effected in various manners known to the person skilled in the art. On ceramic filter elements the surface may be glazed, or organic coatings may be used according to the process requirements. Organic coatings are obviously useful in the case of organic filtering elements. Metal foils is another possibility.

A further object of the invention is to provide a method of sealing a crossflow membrane filtering unit comprising one or more filtering elements within a housing.

Preferably, filtering units according to the invention are used in water filtration, more preferably water ultrafiltration; most preferably filtering units according to the invention are used in the production of heat sterilised, pyrogen-free water.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

The invention is described below with reference to the enclosed drawings.

Figure 3:
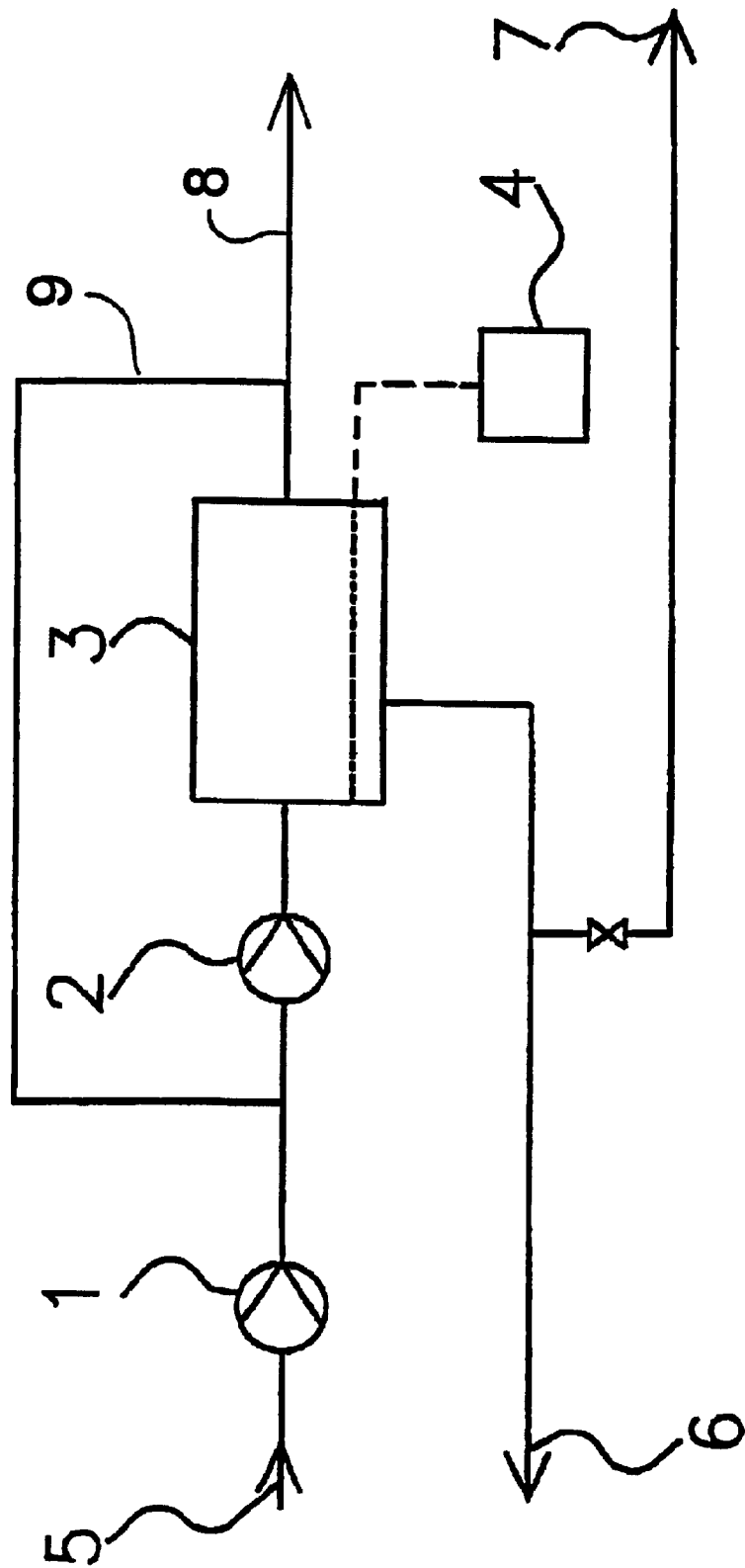
FIG. 3 is a schematic overview of a crossflow filtration system.

In FIG. 3, an overview of crossflow filtering system is shown. Material to be filtered enters through the feed line 5, by means of pump 1. Pump 2 serves the filtration circuit, in which the mixture is pumped across filter unit 3. Filter unit 3 can be of any suitable type, e.g. the plate stack type or the tube or tube bundle type mentioned above. Part of the circulating fluid penetrates the pores of the filtering elements, forming the permeate, which eaves through line 6 or alternatively through reject line 7. To keep the concentration of retained material in the filtration circuit at a desired level, a retentate stream is withdrawn through line 8, while the balance remains in the filtration circuit 9.

Figure 1:
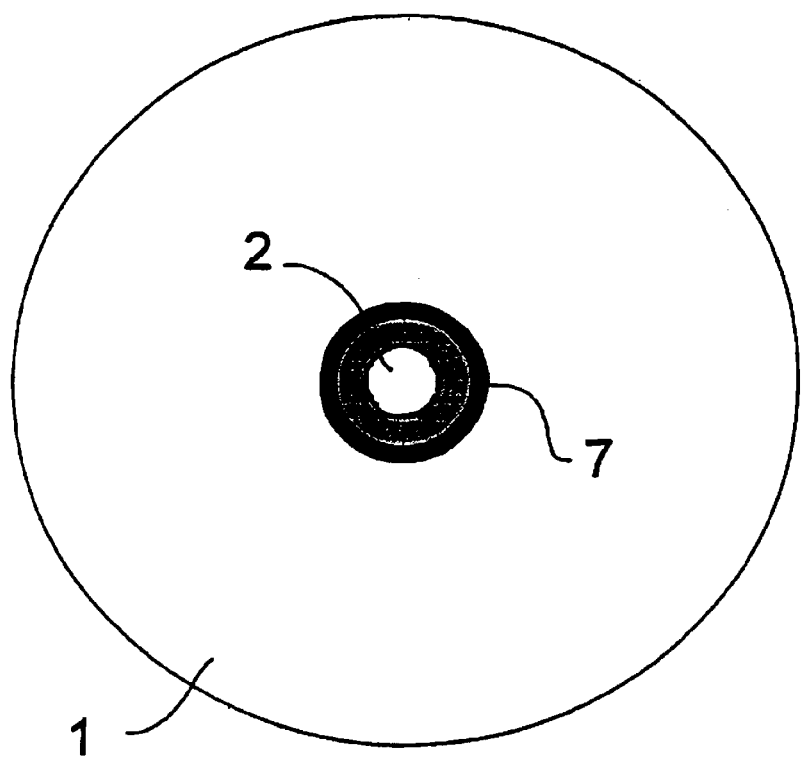
FIG. 1 shows a ceramic filter plate according to the prior art.
Figure 2:
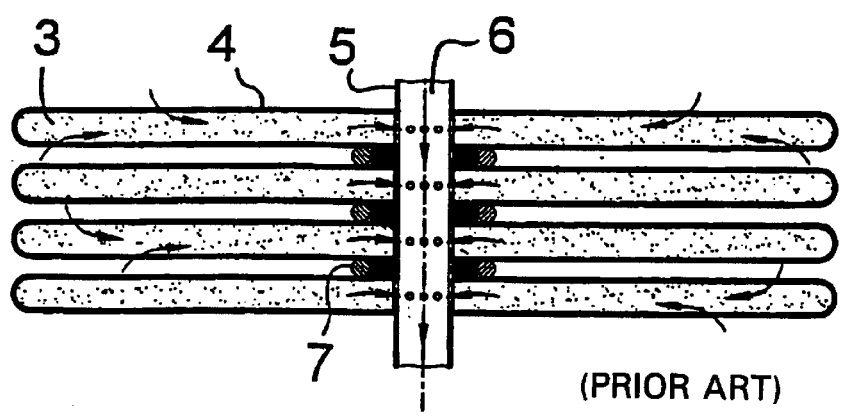
FIG. 2 shows a sideways section of a plate stack according to the prior art, assembled from plates.
Figure 4:
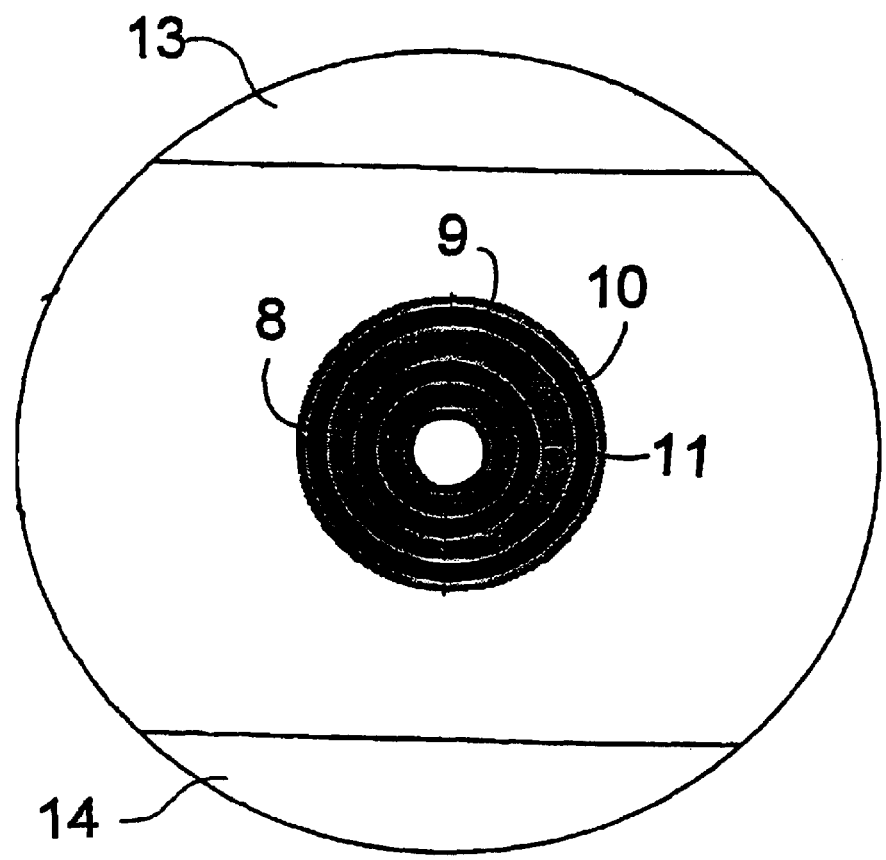
FIG. 4 shows a ceramic filter plate according to the present invention.
Figure 5:
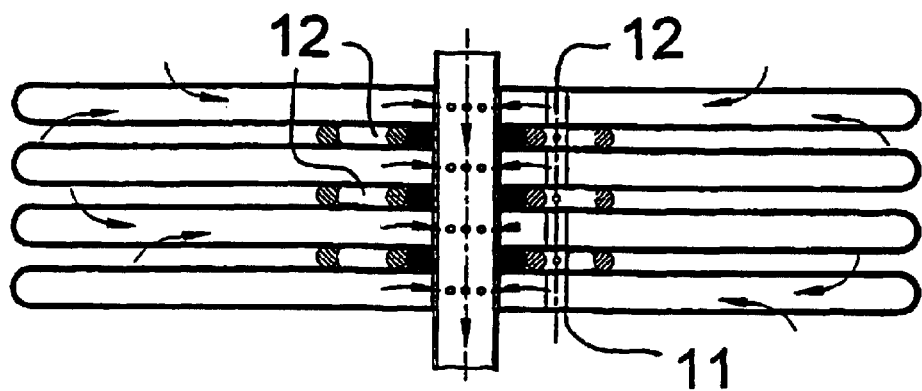
FIG. 5 shows a sideways section of a plate stack according to the present invention, assembled from plates according to claim 4.

FIG. 4 shows a filter plate according to the invention in a view corresponding to that of the prior art plate shown in FIG. 1. In the central zone of the plate, a sealed-surface area 8 has been formed. In this area, two concentric O-ring seals 9, 10 of different diameters have been fitted, and in addition an opening 11 with sealed surfaces has been formed. FIG. 5 shows a section analogous to FIG. 2. Through openings 11, an essentially pressureless unitary space 12 is formed, surrounding the permeate channel and limited by the seal surfaces and sealed surface areas of the plates. The space 12 communicates with the outside. Permeate that has penetrated the membrane into the porous carrier body cannot penetrate the sealed surface into space 12, but can only enter the permeate channel, as the walls of the central bores are not sealed. If a leak occurs in seal 9, the liquid leaking through flows into space 12 and out, indicating the presence of a leak. As the pressure in the permeate channel is also greater than in space 12, also leaks occurring in the inner seals 10 are revealed, but the feed mixture is fully prevented from entering the permeate channel. Space 12 is connected to the outside e.g. via a tube through the filter housing.

The plates shown are circular, but other shapes may be used. For example, segments 13, 14 may be cut off as shown in FIGS. 1 and 5.

Figure 6:
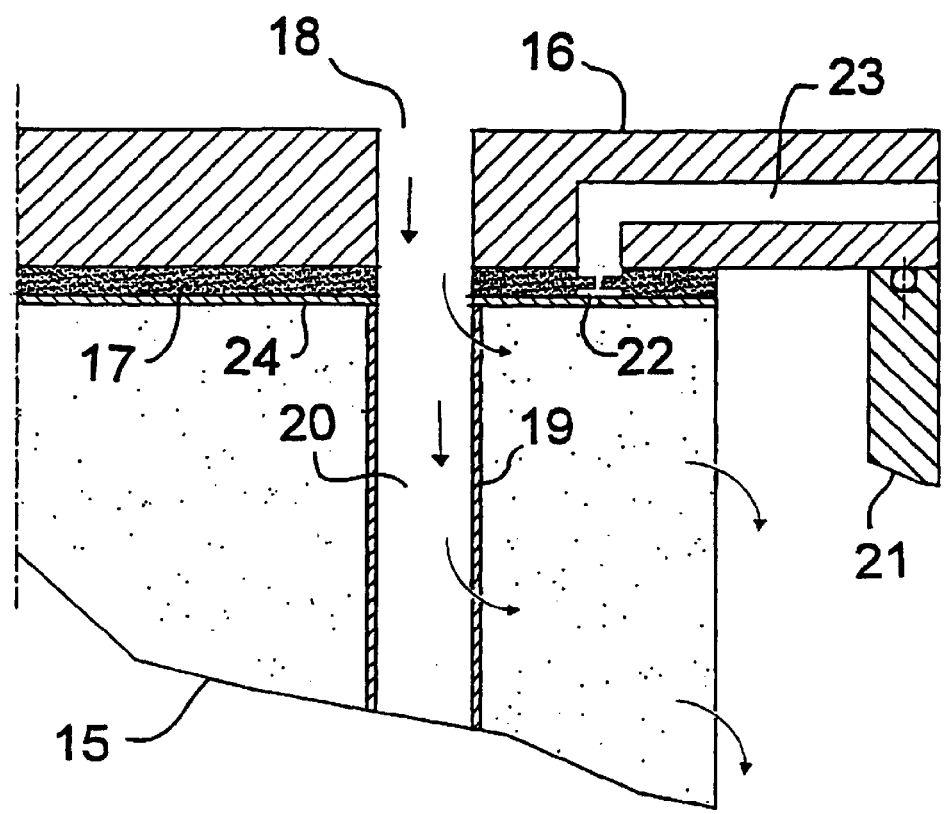
FIG. 6 shows an embodiment of the present invention, wherein a tubular type filter element is used and the seal is located between the end wall of the element and the head of the housing.

FIG. 6 shows a partial section through the end of another type of filter unit, along a plane parallel to the filtration circuit flow. This unit comprises a tubular filter element 15, a housing head 16 and a seal 17 between these. The end wall of the filter element is sealed by the impermeable layer 24. The feed mixture enters at connection 18 and flows under pressure through the inner channels 20 of the element 15, coated with membrane 19. The permeate flows through the membrane and the porous body 25 of element 15 into the shell space formed by housing wall 21. According to the invention, seal 17 comprises an internal leak detection channel system 22, formed by grooves in the upper and lower surfaces of seal 17, said grooves being interconnected by evenly spaced openings. The channel system 22 communicates with the outside by channel 23, formed in housing head 16. As the feed mixture penetrates the inner part of the filter from the pressure side (18,20) of seal 17, it flows into channel 22 and out via channel 23, indicating the presence of a leak, regardless of whether the leak flow occurs along the upper or the lower face of the seal. The permeate side being normally under a higher pressure than the surroundings, permeate-side seal failures are likewise revealed when the leaking fluid seeps out of channel 23.

Figure 7:
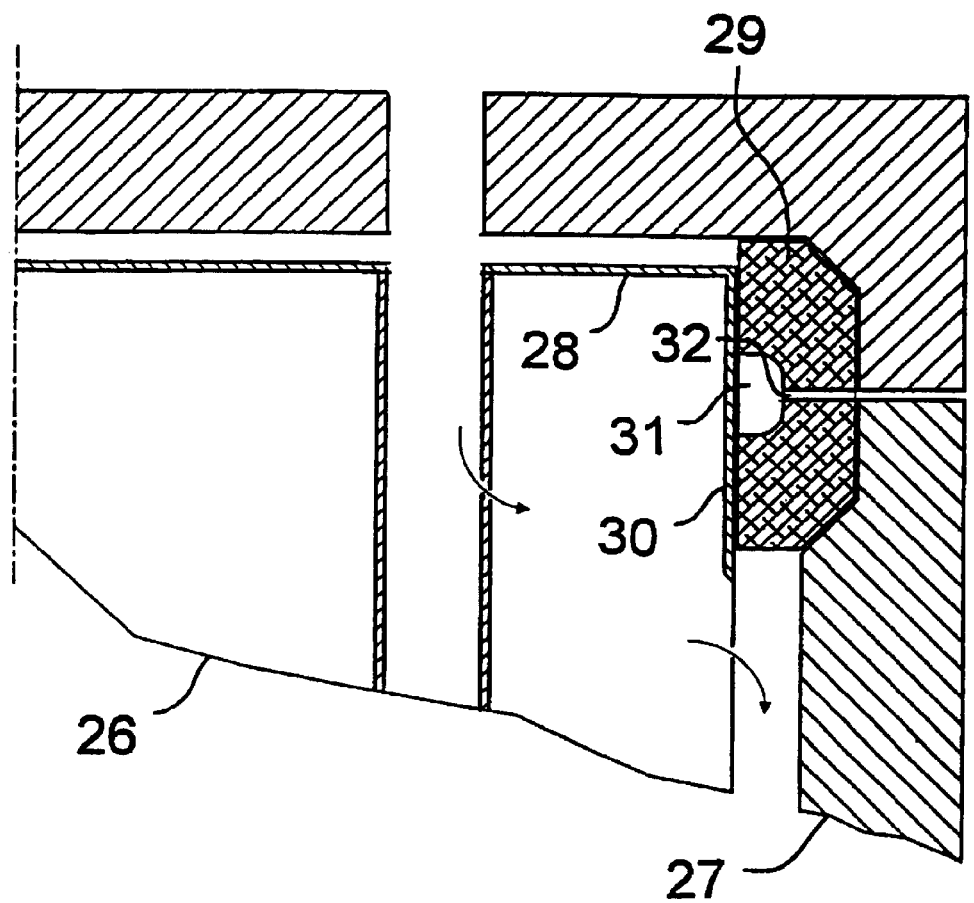
FIG. 7 shows an embodiment of the present invention, wherein a tubular type filter element is used a nd the seal is located between the sidewalls of the element and the housing.

In the embodiment of FIG. 7, seal 29 is provided between the end wall of tubular filter element 26 and the housing wall 27. The end surface 28 of the filter element and the wall surface section 30 at the site of filter element are impermeably sealed. On the inner face of seal 29 are provided groove 31 and at least one exit channel 32 connected to the outside, providing a leak indicating channel system in the same manner as illustrated in FIG. 6. Possible leaks lead to flows from the joint between the housing head and the housing wall.

Automatic detection of leak flow may be provided in addition to or instead of visual observation. For example, moisture sensors may be provided in the intermediate spaces 12, 22, 31 or their corresponding exit channels, as shown schematically as 4 in FIG. 3.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A crossflow ceramic membrane filtering unit comprising:
    a housing;
    one or more filtering elements coated with a filtering membrane on a filtering portion and having an impermeable surface in a sealing region;
    joints between the filtering element impermeable surfaces or between the filtering elements impermeable surfaces and the housing being sealed by means of a gasket system, the gasket system defining an inner seal and an outer seal with an internal intermediate space defined between the inner and outer seals; and
    a means connected with the internal intermediate space to indicate a leak through one of the seals of the gasket system.

2. The ceramic membrane filtering unit according to claim 1, wherein the intermediate space is connected to the outside of the filtering unit.

3. The ceramic membrane filtering unit according to claim 1 wherein the means includes:
    a sensor for indicating fluid leaking into the intermediate spaces.

4. A crossflow ceramic membrane filtering unit comprising:
    a housing;
    one or more plate-shaped filtering elements having permeate discharge apertures, said elements being jointed together and to the housing, said permeate discharge apertures being formed through impermeable central zones of the elements to define a conduit for permeate removal, the outer surface of the elements being coated with a filtering membrane any being essentially free to receive material to be filtered;
    the plate-shaped elements being fitted to each other and to the housing by means of at least two gaskets, the impermeable central zones of the elements forming intermediate spaces delimited by the gaskets and the impermeable central zones, and said intermediate spaces being interconnected by leakage fluid apertures in the elements, said leakage fluid apertures having impermeable surfaces.

5. A crossflow ceramic membrane filtering unit comprising:
    a housing;
    at least one tubular filtering element having at least one channel internally coated with a filtering membrane and at least one impermeable surface surrounding the channel;
    a joint between the filtering element and the housing being sealed by means of a gasket system, the gasket system including a pair of annular sealing surfaces which define an internal intermediate space, the pair of sealing surfaces defining a redundant seal between the housing and impermeable surface of the filtering element;
    at least one exit channel connected with the internal intermediate space to discharge any fluid that bypasses one of the sealing surfaces.

6. A method for sealing a ceramic crossflow membrane filtering unit which includes one or more filtering elements within a housing, said elements being partly coated with a filtering membrane and having an impermeable sealing surface portion, the method comprising:
    sealing joints between at least one of the impermeable sealing surface portions of the filtering elements and between the impermeable sealing surface portions of the filtering elements and the housing by a gasket system which includes a pair of seals with an intermediate space defined therebetween;
    monitoring or a liquid in the intermediate space to identify leakage in the gasket system.

7. The method according to claim 6 further including:
    filtering water through the filtering elements.

8. The method according to claim 7 further including ultrafiltering the water.

9. A crossflow membrane filtering unit comprising:
    at least one filter element having a feed surface over which a feed liquid flows and a discharge surface from which a permeate flow is discharged;
    a seal assembly disposed between the filter element and one of: (1) another filter element and, (2) a housing, the seal assembly including:
        a first seal portion in fluid communication with the feed liquid flow,
        a second seal portion in fluid communication with the permeate flow, and
        an intermediate space between the first and second seal portions, the intermediate space being in communication with a leakage discharge channel such that liquid discharges through the discharge channel is indicative of leakage through at least one of the first and second seal portions.

10. The crossflow membrane filtering unit according to claim 9 wherein the at least one filter element includes:
    a plurality of filter plates, each plate having an aperture defined adjacent the discharge surface, an impermeable surface surrounding the aperture, the feed surface surrounding the impermeable surface, the plates being stacked with pairs of the first and second seal portions disposed in a sealing relationship between the impermeable surfaces of adjacent plates with one of the intermediate spaces being defined between each of the pairs first and second seal portions, the apertures defining a passage between intermediate spaces.

11. The crossflow membrane filtering unit according to claim 10 wherein the first and second seal portions each include an annular gasket, the gaskets being mounted concentrically between the impermeable surfaces of two adjacent filter elements such that an annular region between the gaskets defines the intermediate space.

12. The crossflow membrane filtering unit according to claim 9 wherein the filter element includes:
    an interior bore extending between end surfaces, the interior bore being surrounded by the feed surface;
    the end surfaces being impermeable, the seal assembly being disposed between at least one end surface and a housing in which the filtering element is received.

13. The crossflow membrane filtering unit according to claim 9 wherein the filter element includes:

an interior bore defined by the feed surface;

a peripheral surface having an impermeable ring at least at one end and the permeate surface defined thereadjacent;

the seal assembly being disposed between the impermeable ring and a housing in which the filter element is received.

14. The crossflow membrane filtering unit according to claim 9 further including:

a sensor disposed in communication with the intermediate space for sensing a presence of liquid in the intermediate space.

15. A method of ceramic membrane filtering comprising:

flowing a feed liquid over a feed surface of a filter element and discharging a permeate liquid from a discharge surface of the filter element, the feed liquid and the permeate liquid being separated from each other by a seal assembly disposed between the filter element and at least one of another filter element and a housing in which the filter element is received, the seal assembly having a first seal for sealing the feed liquid from an intermediate space and a second seal for sealing the permeate liquid from the intermediate space, the intermediate space being defined between the first and second seals;

monitoring the intermediate space for the presence of liquid.

16. The method according to claim 15 further including:

in response to detecting liquid in the intermediate space, determining whether the liquid is the feed liquid or the permeate liquid.

17. The method according to claim 15 wherein the feed liquid is heat sterilized water.

\* \* \* \* \*